United States Patent
Gautier et al.

[11] Patent Number: 5,279,203
[45] Date of Patent: Jan. 18, 1994

[54] PNEUMATIC BRAKE BOOSTER WITH AIR GUIDE SURFACES

[75] Inventors: Jean-Pierre Gautier; Ulysse Verbo, both of Aulnay-Sous-Bois; Miguel Perez, Argenteuil, all of France

[73] Assignee: Bendix Europe Services Techniques, Drancy, France

[21] Appl. No.: 878,083

[22] Filed: May 4, 1992

[30] Foreign Application Priority Data

May 14, 1991 [FR] France .................... 9105843

[51] Int. Cl.⁵ .............................................. F15B 9/10
[52] U.S. Cl. ........................... 91/369.1; 91/376 R; 92/99
[58] Field of Search ............... 91/369.1, 369.2, 369.3, 91/376 R; 92/96, 98 R, 99, 100

[56] References Cited

U.S. PATENT DOCUMENTS

| 3,387,540 | 6/1968 | Wilson | 91/376 |
| 3,410,179 | 11/1968 | Kytta et al. | 91/376 R |
| 3,661,054 | 5/1972 | Brown | 91/376 R X |
| 4,794,844 | 1/1989 | Taft | 91/369.3 X |

FOREIGN PATENT DOCUMENTS

| 2417384 | 11/1975 | Fed. Rep. of Germany | 91/376 R |
| 3413739 | 10/1985 | Fed. Rep. of Germany | 91/369.1 |
| 3924672 | 1/1991 | Fed. Rep. of Germany | |
| 2551009 | 3/1985 | France | |
| 2054777 | 2/1979 | United Kingdom | |
| 2237082 | 4/1991 | United Kingdom | |

Primary Examiner—Edward K. Look
Assistant Examiner—Hoang Nguyen
Attorney, Agent, or Firm—Larry J. Palguta; Ken C. Decker

[57] ABSTRACT

The invention relates to a pneumatic brake-booster comprising a casing (10), inside which is situated a piston (20) comprising a rear tubular part (22) and a movable wall (12) defining a front chamber (16) permanently connected to a vacuum source and a rear chamber (18) selectively connected to the front chamber (16) or to the atmosphere by a valve mechanism (20a, 32a, 40) actuated by a control rod (34) adapted to bear, by way of a plunger (32) against one face of a reaction disk (58) fastened to a push rod (56), the valve mechanism comprising a valve closure member (40) cooperating by an active part with a first valve seat (32a) formed on the plunger (32) and with a second valve seat (20a) formed on the piston (20). According to the invention, a guide mechanism (62) for the air in movement are provided upstream of the valve mechanism.

6 Claims, 1 Drawing Sheet

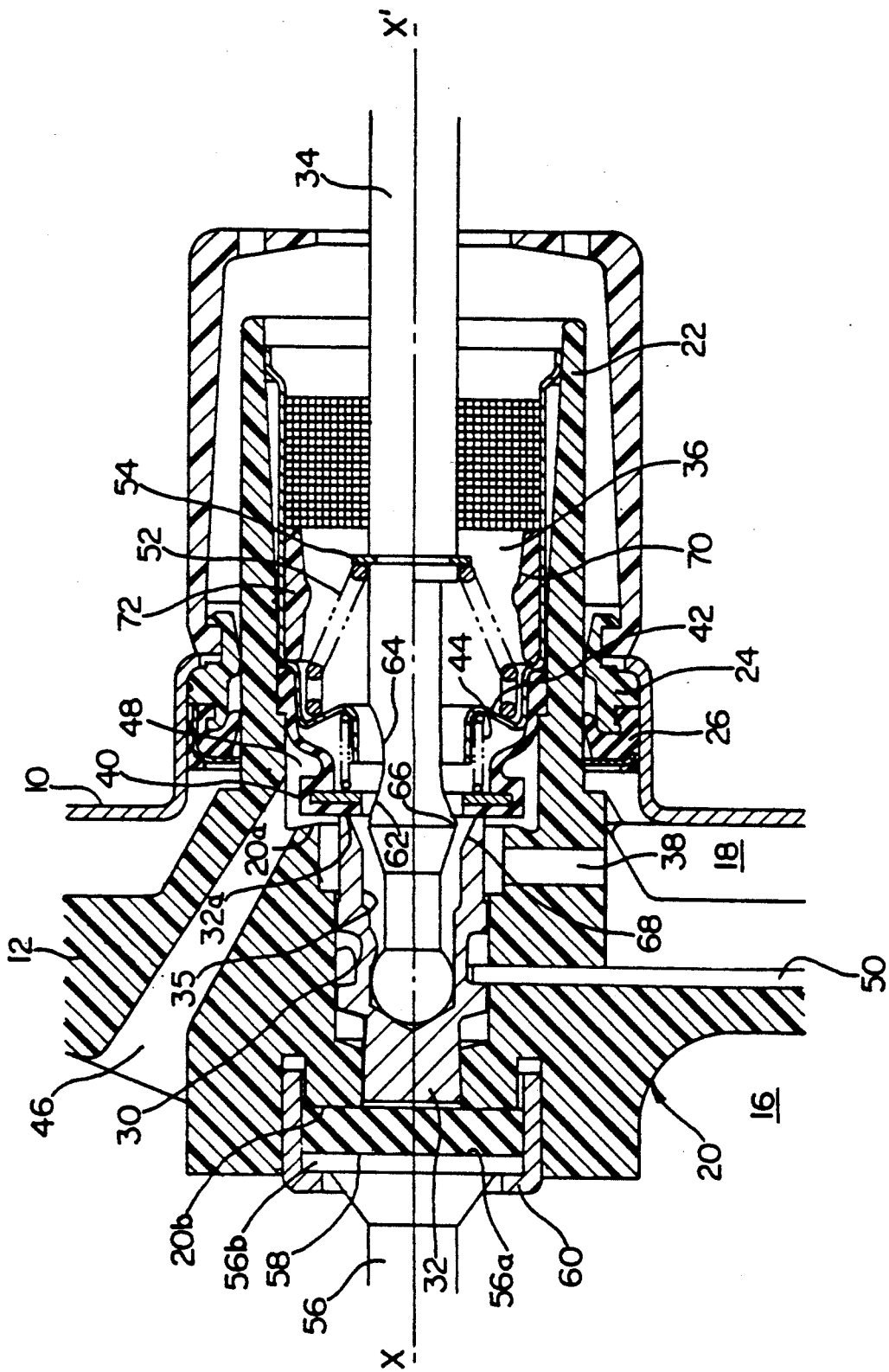

PNEUMATIC BRAKE BOOSTER WITH AIR GUIDE SURFACES

The present invention relates to pneumatic boosters, more particularly of the type used to provide brake assistance in automobile vehicles.

Conventionally, boosters of this type consist of a piston comprising a rear tubular part and a movable wall which defines a front chamber permanently connected to a vacuum source and a rear chamber selectively connected to the front chamber or to the atmosphere by a valve means actuated by a control rod adapted to bear by means of a plunger against one face of a reaction disk fastened to a push rod, the valve means comprising a valve closure member cooperating by an active part with a first valve seat formed on the plunger and with a second valve seat formed on the piston, and the control rod being returned towards the rear by means of a spring housed in an annular space between this control rod and the rear tubular part of the piston upstream of the valve means, this spring being formed from turns which define a surface.

Boosters of this kind, as illustrated for example by the document EP-A-0 004 477, although their action is satisfactory, nevertheless have some disadvantages. Thus, in order to avoid too long an idle stroke of the control rod, it is necessary to design the valve means in such a way that the valve lift between the valve closure means and the second valve seat is as short as possible. Consequently, the passage provided for atmospheric air toward the rear chamber during braking has a very small section. The operation of these boosters is therefore accompanied by air suction noise which may become bothersome, particularly as the structure of the piston hub also gives rise to considerable turbulence in the moving air.

From the documents FR-A-2 551 009 or DE-A-3 413 739, for example, pneumatic boosters are known in which the rear end of the plunger has been modified to guide the moving air toward the rear chamber, while the other parts of the booster remain conventional. This has the consequence that these devices are practically as noisy as conventional devices.

In this context, the object of the present invention is to provide a booster which will operate silently, and lies especially in showing clearly that a flow of air along a direction adjacent to that of the surface of turns of the return spring sets the latter into vibration and constitutes a major cause of operation noise.

For this purpose, the booster of the invention is essentially characterized in that it comprises, on one side at least of the spring, air guide means suitable for increasing the angle at which the air in movement in the annular space attacks the surface of turns.

Preferably the guide means comprise a downstream concave guide surface formed in the control rod downstream of the spring and an upstream concave surface located in the annular space upstream of this spring.

For example, the downstream guide surface comprises the upstream flank of a convex thickened portion of the rod and the upstream concave surface comprises the inside wall of a ring inserted into the annular space.

Other aims, characteristics and advantages will appear from the description which follows of one embodiment of the present invention, given in a non-limiting way, with reference to the accompanying drawing, in which:

The single figure is a side view in longitudinal section, showing the central part of a pneumatic brake-booster constructed in accordance with the present invention.

The figure shows a part of a brake-booster intended to be installed in the usual way between the brake pedal of a vehicle and the master cylinder controlling the hydraulic brake circuit of this vehicle. Conventionally the part of the booster turned toward the master cylinder will be called the front, and the part turned toward the brake pedal will be called the rear.

The booster shown in the figure comprises an outer shell-shaped casing 10 possessing symmetry of revolution about an axis X—X'. Only the rear central part of this casing 10 is shown in the figure.

Inside the space delimited by the casing 10 a movable wall 12 defines a front chamber 16 and a rear chamber 18. The movable wall 12 is associated with a flexible unwinding diaphragm (not shown) of elastomer material, whose outer peripheral edge is sealingly fastened on the outer casing 10 and whose inner peripheral edge is received sealingly in a hollow booster piston 20 disposed along the axis X—X' of the booster. This hollow piston 20 is extended toward the rear in the form of a tubular portion 22 passing sealingly through the rear wall of the casing 10. Leaktightness at this point is achieved with the aid of a reinforced annular seal 24, which is fastened by a ring 26 in a tubular central part forming a rearward extension of the rear wall of the casing 10.

A compression spring (not shown) interposed between the piston 20 and the front wall (not shown) of the outer casing 10 normally holds the piston 20 in a rear position of rest, which is shown in the figure and in which the rear chamber 18 has its minimum volume and the front chamber 16 its maximum volume.

In the central part, situated ahead of the rear tubular portion 22, of the movable wall the piston 20 has a bore 30 in which is slidingly received a plunger 32 likewise possessing symmetry of revolution about the axis X—X'. The front end of a booster control rod 34, likewise disposed along the axis X—X', is mounted ball-jointedly in a blind bore 35 formed in the plunger 32. The rear end (not shown) of the rod 34, which projects outside the tubular portion 22 of the piston 20, is controlled directly by the brake pedal (not shown) of the vehicle.

The annular space 36 delimited between the control rod 34 and the tubular portion 22 of the piston 20 leads out to the atmosphere at the rear of the booster, for example by way of an air filter. Toward the front this same annular space can communicate with the rear chamber 18 through a radial passage 38 formed in the central part of the piston when assistance means controlled by the plunger 32 are actuated.

In conventional manner these assistance means comprise a three-way valve consisting of an annular valve closure member 40 mounted in the tubular portion of the piston and two annular valve seats 20a and 32a formed respectively on the central portion of the piston 20 and on the plunger 32.

The valve closure member 40 forms the front end, of smaller diameter, of a flexible elastomer sleeve whose rear end terminates in a bead mounted sealingly inside the tubular portion 22 of the piston 20. The bead is held in place by a metal cup 42, against which bears a compression spring 44 urging the valve closure member 40 in the forward direction.

The annular valve seat 32a is formed on the rear end face of the plunger 32. In comparable manner, the annular valve seat 20a is formed on the rear end face of the central portion of the piston 20, around the seat 32a. Depending on the position of the plunger 32 inside the piston 20, this arrangement enables the valve closure member 40 always to bear sealingly against at least one of the valve seats 32a and 20a through the action of the spring 44.

A second passage 46 is formed in the central portion of the piston 20, approximately parallel to the axis X—X' of the latter, in order to bring the front chamber 16 of the booster into communication with an annular chamber 48 formed around the valve closure member 40, inside the tubular portion 22 of the piston 20. When the plunger 32 occupies its rear position of rest which is shown in the figure, and in which the valve closure member 40 bears sealingly against the seat 32a of the plunger 32 and is a short distance from the seat 20a of the piston 20, the front chamber 16 and rear chamber 18 of the booster are thus in communication with one another by way of the passage 46, the annular chamber 48, the valve passage 40-20a, and the passage 38.

Likewise in conventional manner, at least one stop member 50 mounted in the central portion of the piston 20 delimits the axial stroke of the plunger 32 inside the latter. The plunger 32 is normally held in the rear position of rest, defined by the member 50, by means of a compression spring 52 interposed between the cup 42 and a washer 54, which in turn is fastened to the control rod 34.

In its central portion the piston 20 comprises an annular front face 20b, onto the center of which the bore 30 leads out. This annular front face 20b of the piston 20 acts on a rear face 56b of a push rod 56 through a reaction disk 58 of a deformable material, such as an elastomer. More precisely, the push rod 56 and the reaction disk 58 are disposed along the axis X-X' of the booster, in line with the control rod 34 and the plunger 32. The rear surface 56a of the push rod 56 is formed on a disk-shaped plate 56b constituting the rear end of the rod 56. The plate 56b and also the reaction disk 58 are capped by a hood 60 centered on the axis X—X' of the booster and cooperating with an annular groove formed on the central part of the piston 20, around the annular front face 20b of the latter.

The operation of this known booster is conventional and may be briefly described as follows.

When the booster is installed in a vehicle, the front chamber 16 is permanently in communication with a vacuum source.

In a first stage the depression of the brake pedal by the driver has the effect of equaling the prestress force of the spring 52 minus the prestress force of the spring 44. In the course of this slight displacement of the control rod 34 and of the plunger 32 the valve closure member 40, under the action of the spring 44, follows the seat 32a of the plunger 32 until it comes into contact with the piston seat 20a; the front chamber 16 and rear chamber 18 of the booster are then isolated from one another.

In a second phase of the actuation of the brake the plunger 32 is displaced sufficiently far forward for the valve closure member to be in sealing contact with the piston seat 20a and to start to move away from the plunger seat 32a. Under these conditions, the rear chamber 18 of the booster is isolated from the front chamber 16 and comes into communication with the atmosphere.

The rear chamber 18, which was previously in communication with the front chamber 16 and was therefore under reduced pressure, consequently draws in air at atmospheric pressure through the valve passage of small section between the valve closure member 40 and the plunger seat 32a. There is thus considerable obstruction of the air passage, together with whistling due to passage through the gap between the valve closure member 40 and the plunger seat 32a.

It will therefore be understood that it is highly desirable to provide a booster in which the air flow has the least possible turbulence, so that it will operate silently.

This object is achieved by virtue of the invention, of which one example of embodiment is illustrated in the figure.

According to the invention provision is made to guide or channel the air in movement so that it reaches the region of the valve closure member 40, and in particular the valve passage 32a-40 between the valve closure member 40 and the plunger valve seat 32a, under the best possible conditions. This guidance is provided upstream of the valve closure member 40 in the axial direction, that is to say behind the plane of the valve closure member 40 in the vicinity of the spring 52. This is achieved simply by providing on the control rod 34 a deflector surface 62, for example a conical surface or one having a certain radius of curvature as is illustrated in the figure. This deflector surface 62 extends from the annular space 36 between the control rod 34 and the tubular part 22 of the piston 20 to the position of the valve closure member 40.

The deflector surface 62 may be formed by the downstream flank of a wide concave groove 64 formed in the control rod 34, as shown in the top half of the figure. It may also be formed by the upstream flank of a convex thickened portion 66 of the rod 34, as shown in the bottom half of the figure. This thickened portion 66 may be formed integrally with the rod 34 or may consist of a ring threaded onto the rod 34.

It will therefore be understood that during the second phase of operation described above the layers of air coming from the annular space 36 and moving axially forwards will encounter the deflector surface 62 and thus be deflected toward the valve passage 32a-40 by traversing the surface which the turns of the spring 52 form much more easily than if they could simply flow tangentially to this surface. The air in movement therefore no longer undergoes sharp changes of direction and is thus no longer liable to produce noise or whistling during this phase of suction toward the rear chamber.

Various improvements may be made in order to perfect the guiding of the air in movement. It is for example possible to provide, at the end of the blind bore 35 leading out at the rear of the plunger 32, a concave, for example chamfered surface 68 which is frustoconical or has a certain radius of curvature. A concave surface 68 of this kind also serves as a deflector surface by prolonging the action of the surface 62 of the rod 34. The air stream deflected by the surface 62 of the rod 34 is in fact received by the surface 68 of the plunger 32 and is thus guided up to the valve passage 32a-40 itself. Turbulence of the air in movement is therefore still further reduced, as is also true of operating noise.

In the tubular rear portion 22 of the piston 20, and more precisely in the annular space 36, it is also possible to provide a concave deflector surface 70 to precede the action of the surface 62 of the rod 34. A surface of this kind serves the purpose of receiving the air flow in movement and directing it preferentially onto the surface 62 of the rod 34. This surface 70 may for example be formed on the inside wall of a ring 72 inserted into the annular space 36.

It is thus clearly seen that according to the present invention a pneumatic booster has been provided in which the particular arrangement of the deflector surfaces enables it to operate silently. The invention is obviously not limited to the embodiment which has been described by way of example, but may undergo numerous modifications which occur to those versed in the art. Thus, for example, the invention may be applied to boosters in a tandem arrangement or to those having an additional chamber.

What is claimed is:

1. A pneumatic brake-booster, comprising a casing inside which is situated a piston comprising a rear tubular part and a movable wall defining a front chamber connected permanently to a vacuum source and a rear chamber connected selectively to one of the front chamber and atmosphere by valve means actuated by a control rod adapted to bear by means of a plunger against one side of a reaction disk engaging a push rod, the valve means comprising a valve closure member cooperating with a first valve seat formed on the plunger and with a second valve seat formed on the piston, the control rod biased by means of a spring housed in an annular space between the control rod and the rear tubular part of the piston upstream of the valve means, the spring formed from turns which define a surface, and the booster comprising, on at least one side of the spring, air guide means for increasing the angle at which air moving in the annular space encounters the surface of turns, the air guide means comprising a downstream concave guide surface formed in the control rod downstream of the spring.

2. The booster according to claim 1, wherein the downstream concave surface comprises a downstream flank of a concave groove formed in the control rod.

3. The booster according to claim 1, wherein the downstream concave guide surface comprises an upstream flank of a convex thickened portion formed in the control rod upstream of where the control rod engages the plunger.

4. The booster according to claim 1, wherein the air guide means comprises a downstream concave surface formed at a rear end of the plunger.

5. The booster according to claim 1, wherein the air guide means comprises an upstream concave surface situated in the annular space upstream of the spring.

6. The booster according to claim 5, wherein the upstream concave surface comprises an inside wall of a ring in the annular space.

* * * * *